UNITED STATES PATENT OFFICE.

FREDERICK H. EICHBAUM AND ANDREW GEORGE HUNTER, OF DETROIT, MICHIGAN.

IMPROVEMENT IN PROCESSES OF MANUFACTURING ILLUMINATING-GAS.

Specification forming part of Letters Patent No. 166,352, dated August 3, 1875; application filed August 28, 1874.

*To all whom it may concern:*

Be it known that we, FREDERICK H. EICHBAUM and ANDREW G. HUNTER, of Detroit, in the county of Wayne and State of Michigan, have invented an Improvement in the Process of Manufacturing Illuminating-Gas, of which the following is a specification:

The object I have in view is the production of a permanent or fixed gas by diluting the vapors generated in the decomposition of hydrocarbons with the gases evolved in the destructive distillation of wood, so that the chemical union of both shall produce an illuminating-gas of the candle-power required; and our invention therein consists in the process employed, which consists in first vaporizing the hydrocarbons in a suitable retort, then in conducting such vapors into contact with the interior surface of a suitable retort, then in conducting gases evolved from the destructive distillation of wood in other retorts into the retort into which the hydrocarbon vapors have been introduced; and, finally, in quickly removing the resultant gases from said retort.

In order to enable those skilled in the art to use our process, we proceed to describe more fully how the same may be effected.

Into a proper retort we place solid or liquid hydrocarbons, and employ sufficient heat to vaporize the same. The resultant vapors are then conducted into contact with the interior surface of a suitable retort at a red heat. At the same time, wood being in the act of destructive distillation in another suitable retort, the resultant gases are conducted into the red-hot retort before mentioned, wherein they assist in the process of the conversion of hydrocarbon vapors into illuminating-gases, and at the same time become combined chemically with the same, and form a fixed or permanent illuminating-gas.

We are aware of the patent of December 9, 1862, granted to Mark Levy, and disclaim the same, our invention differing from said Levy's in these respects: Levy generates gases from wood and from hydrocarbons, and then chemically combines them by reheating. We, on the other hand, mix a wood-gas with hydrocarbon vapors, while the said vapors are in the act of conversion into illuminating-gas, and thereby avoid wholly the decomposition and deposit which Levy seeks to avoid, but does not entirely, by reheating the two gases.

We do not claim, broadly, the mixing of a gas of low illuminating power with hydrocarbon vapors, and then fixing them by passing through a highly-heated retort; but,

Having thus described our invention, what we claim as new therein is—

The process described, consisting of vaporizing hydrocarbons in a retort, and at the same time distilling wood in another retort, then in conducting the vapors of the hydrocarbons and the wood-gases into another retort at a red heat, then in removing quickly the combined resultant gas, all substantially as described.

FREDERICK H. EICHBAUM.
ANDREW G. HUNTER.

Witnesses:
H. F. EBERTS,
H. S. SPRAGUE.